United States Patent [19]

Bernhardt

[11] Patent Number: 5,610,656
[45] Date of Patent: Mar. 11, 1997

[54] PROTECTIVE HOUSING FOR OPTICAL EQUIPMENT

[75] Inventor: Rainer Bernhardt, Rosbach, Germany

[73] Assignee: Videor Technical E. Hartig GmbH, Rodermark, Germany

[21] Appl. No.: 388,706

[22] Filed: Feb. 14, 1995

[30] Foreign Application Priority Data

Feb. 22, 1994 [DE] Germany .................. 44 05 626.5

[51] Int. Cl.⁶ ...................................... G02B 7/00
[52] U.S. Cl. ............................ 348/373; 348/143
[58] Field of Search ........................ 348/373, 374, 348/143, 375, 376, 372

[56] References Cited

U.S. PATENT DOCUMENTS

| | | | |
|---|---|---|---|
| 3,879,742 | 4/1975 | Smith | 348/143 |
| 4,394,692 | 7/1983 | Randmae et al. | 348/374 |
| 4,414,576 | 11/1983 | Randmae | 348/373 |
| 5,115,263 | 5/1992 | Bernhardt et al. | 354/81 |
| 5,214,245 | 5/1993 | Bernhardt et al. | 174/52.1 |
| 5,453,785 | 9/1995 | Lenhardt et al. | 348/374 |

Primary Examiner—Wendy Garber
Attorney, Agent, or Firm—Felfe & Lynch

[57] ABSTRACT

A protective housing (1) for optical equipment, especially for video surveillance cameras, has a tubular housing shell (2), a rear wall (4) with means (5) for introducing or passing through electrical lines (6), an internal equipment carrier (16), and an external housing carrier (17), which are held above and below the housing shell (2) at a fixed distance, parallel to each other. To facilitate installation and removal, a frame part (3), to which the equipment carrier (16) and the housing carrier (17) are attached, is installed between the rear wall (4) and the housing shell (2). It is preferable for a replaceable plate (11) to be attached to the frame part (3); for a first part (12) of a multiconductor plug device (13) to be installed on side of the plate (11) facing the rear wall; and for a second part (15) of the multiconductor plug device (13), which can mate with the first part (12), to be installed on the inside surface (14) of the rear wall (4).

19 Claims, 4 Drawing Sheets

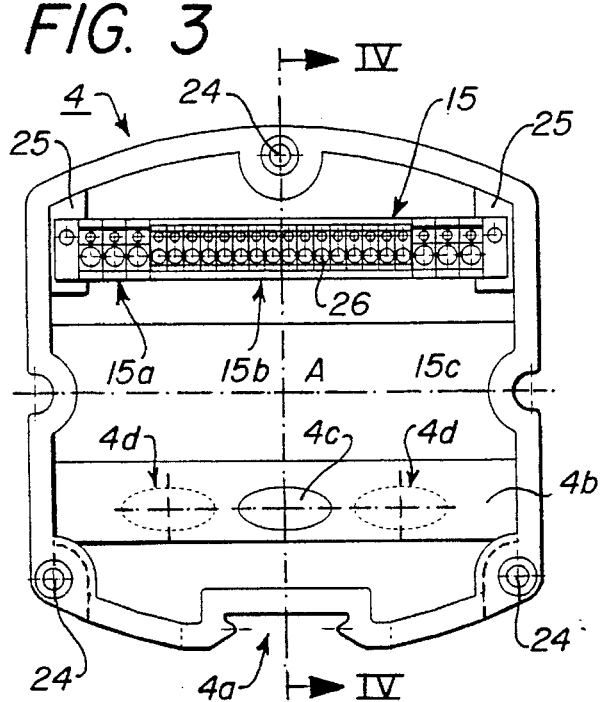
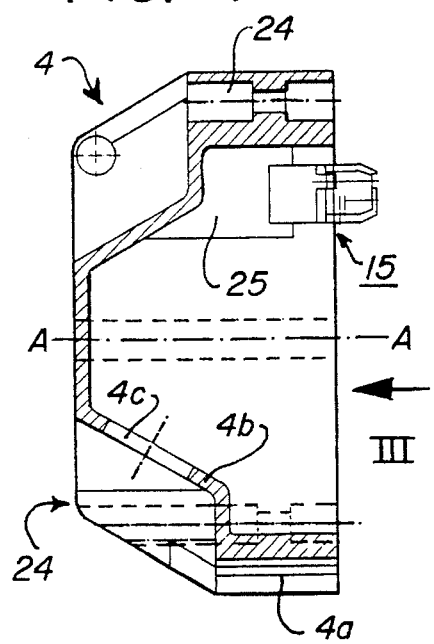
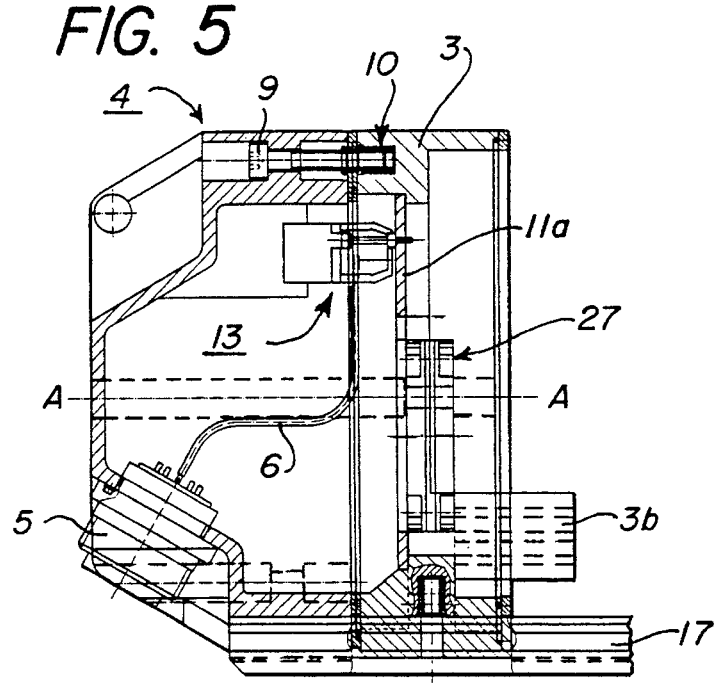

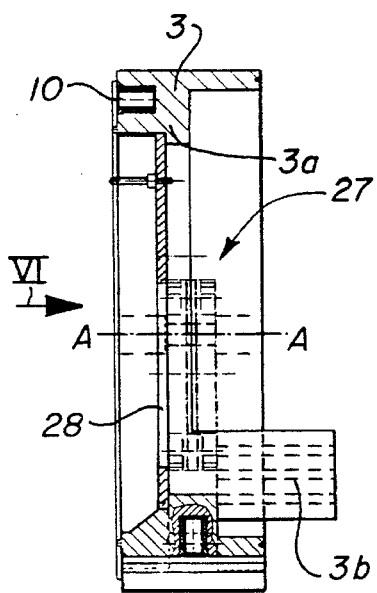
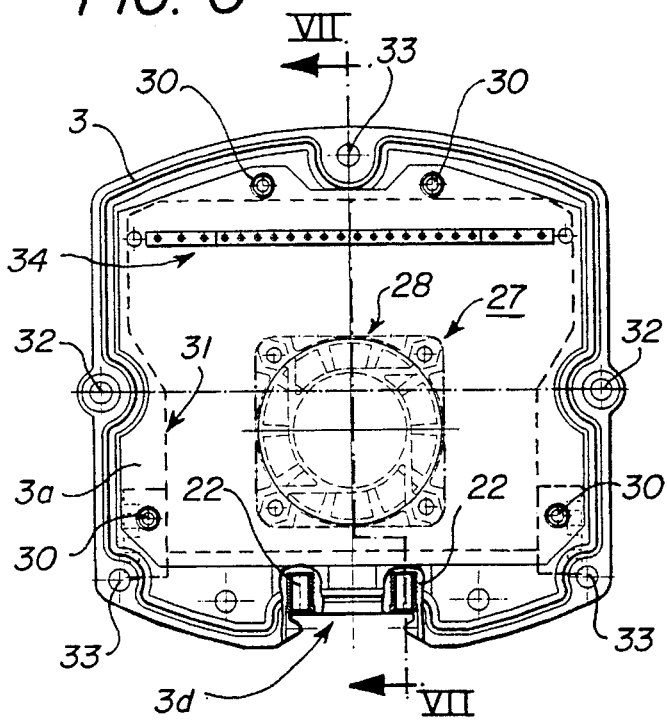
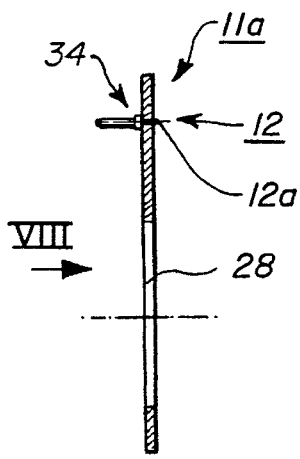
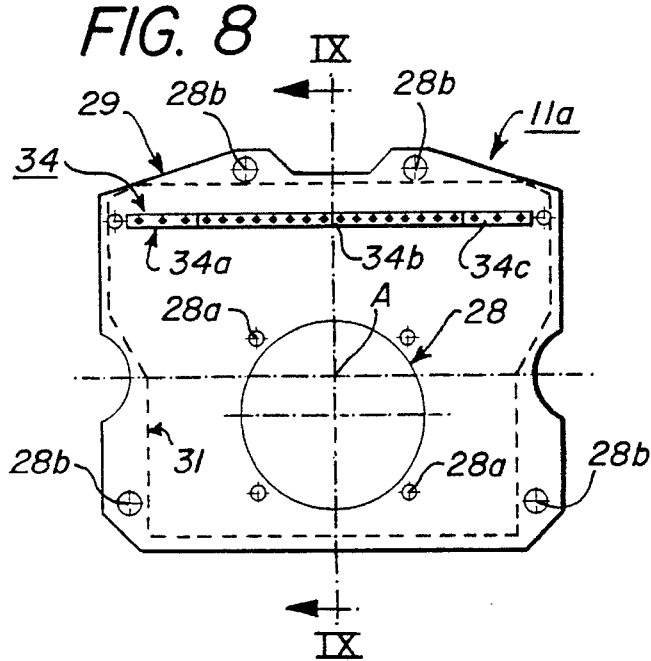

PROTECTIVE HOUSING FOR OPTICAL EQUIPMENT

BACKGROUND OF THE INVENTION

The invention pertains to a protective housing for optical equipment, especially for video surveillance cameras, with a tubular housing shell, and a rear wall with means for introducing or passing through electrical lines. An internal equipment carrier and an external housing carrier are held above and below the housing shell at a fixed distance, parallel to each other.

Protective housings of this type are known from U.S. Pat. Nos. 5,115,263 and 5,214,245 of the same applicant. In both cases, the equipment carrier provided inside the housing and the housing carrier installed underneath the housing are screwed directly to the rear wall. The housing carrier is attached to a bracket and/or to a tilt-and-swivel head slightly below the center of gravity of the entire assembly, so that the housing can also be remotely controlled. After the screws holding the housing shell to the rear wall have been unscrewed, the housing can be pulled out like a telescope, together with the front frame and the viewing window, through the gap between the equipment carrier and the housing carrier, although the optical device, usually a video surveillance camera, remains in its original place. If it is desired to dismount the optical device together with the housing, it is necessary to disconnect numerous electrical connections, which are required for the supply of power, for control purposes, and for signal transmission. U.S. Pat. No. 5,214,245 in particular describes a quite complicated layout of electrical cables.

When, in the case of protective housings of this type, so-called threaded stuffing box joints are used for introducing the cables, a great deal of time consuming work is involved, both during assembly and during disassembly, to thread the cables through the joints, after which the cables must also be connected to numerous terminals inside the housing. When the unit is taken apart, all the connections, which are usually soldered, must then be disconnected again, which is also cumbersome and time-consuming.

It is also known that so-called multiconductor plug couplings, which are exposed to the atmosphere, can be used in protective housings of this type. In this case, however, there are then two sealing problems: first, the sealing problem between the mating parts of the multiconductor plug coupling and, second, the sealing problem between the plug coupling and the rear wall of the protective housing. In addition, multiconductor plug connections of this type which are exposed to the atmosphere are expensive and take up a large amount of space.

SUMMARY OF THE INVENTION

The invention provides a protective housing which makes it much easier and simpler to install and remove the optical device as well as to accomplish the associated job of making and breaking the various electrical connections.

According to the invention, a frame part, to which the equipment carrier and the housing carrier are attached, is provided between the rear wall and the housing shell.

The frame part is now the supporting element, which holds the equipment carrier and the housing carrier parallel to each other, separated from each other by a gap. The rear wall loses its supportive function in this case and serves merely as the place where the electrical lines are introduced and passed through and also as a means of sealing the end of the housing, i.e., at the end opposite the front frame with the viewing window. When the housing with the optical device is removed from the installation site, the rear wall is unscrewed first. Even though the rear wall has been removed, the housing, together with the optical device, remain installed in their original position. By unscrewing the rear wall, however, a very large opening is exposed, which facilitates both the making and the breaking of the electrical connections, regardless of whether some sort of insulated screw terminal is used or whether multiconductor plug connectors are provided inside the housing.

If a threaded stuffing box joint or similar type of pass-through element has been used, it does not need to be removed, and the need to pass cables through a narrow sealing area is completely eliminated. The need to use weather-resistant multiconductor plug couplings is also no longer necessary, as a result of which the sealing problems inside the plug connection itself and between the plug connection and the housing disappear. In the object of the invention, therefore, the cable remains connected to the rear wall, and it is possible to seal off the opening present in the rear wall by a cover fitted to the rear wall, namely, by means of the same screws as those which are used to attach the rear wall to the frame part. This prevents any intrusion of moisture or dirt through the rear wall, during the time that the remaining part of the protective housing with the optical device is removed. Once the rear wall has been unscrewed, the entire housing, together with the optical device, can simply be removed from the bracket and/or the tilt-and-swivel head and brought to the workshop for maintenance or repair. It is also possible, after the other screw joints between the frame part and the housing shell have been unscrewed, to pull out the shell, together with the front frame and the viewing window, like a telescope out through the gap between the equipment carrier and the housing carrier, as is known from the publications cited above. The possibility of easily taking apart the housing therefore remains a viable alternative.

For installation or reinstallation, the only step required, after the completely equipped protective housing has been remounted, is to screw the rear wall, provided with the electrical connectors, to the frame part and to make the electrical connections, which can be done either before the rear wall has been set into position or while it is being set into position.

The housing shell consists normally of a tubular piece of extruded section, which can have practically any desired cross section. A housing shell of this type usually has two side walls, at least essentially parallel, which are connected to each other by an upward-arching roof and by a downward arching floor. On the bottom of the floor part, guide elements are provided to guide the housing shell as it is being pulled out in a telescope-like manner. The cross section of the housing shell, of course, determines at least essentially the external outline of the frame part. The design is chosen in such a way that the external outlines of the housing shell, frame part, and rear wall are aligned with each other at least at the sides and at the top of the housing.

While the housing shell normally consists of an anodized or lacquered aluminum alloy, it is especially advantageous for the frame part to be made of plastic, so that threaded bushes made of metal can be embedded in the plastic during the injection molding process. These bushes can then be used for attachment of the rear wall and the housing carrier.

It is advantageous for the frame part to have an opening which corresponds to at least 40%, preferably to at least 60%, of the outside cross section of the frame part. This external cross section is determined by the outline of the frame part. The electrical wiring can be passed through this opening, when, for example, the connections are to be made by means of simple insulated screw terminals.

It is especially advantageous to give the frame part a T-shaped cross section over at least part of its periphery, with the crossbar of the T pointing inward. This crosspiece thus defines an installation plane for a plate, attached removably to the frame part, the plane being perpendicular to the axis of the housing. In conjunction with a further elaboration of the invention, a first part of a multiconductor plug device is installed on the side of this plate which faces the rear wall, and on the inside surface of the rear wall, a second part of the multiconductor plug device is installed, which is able to mate with the first part. In such a case, the electrical connections are made by setting the rear wall onto the frame part, and when the rear wall is screwed in place, the electrical contacts are automatically established.

It is also possible to provide a device for the forced-air ventilation of the protective housing to ensure that the components inside remain cool. An especially simple way of achieving this is to mount a blower on an appropriately dimensioned opening, preferably a circular opening, in the plate. The blower is preferably an axial blower. If the cooling air is to be recirculated under inclusion of the surrounding air, then the housing should be provided with air inlet and outlet openings, which, of course, must be protected against the intrusion of moisture and dust.

BRIEF DESCRIPTION OF THE DRAWING

FIG. 3 shows an inside view of the rear wall of the housing in the direction of arrow III in FIG. 4;

FIG. 4 shows a vertical, axial cross section through the object according to FIG. 3 along line IV—IV;

FIG. 5 shows an axial cross section through an assembly consisting of the rear wall and the frame part;

FIG. 6 shows a straight-on view of the frame part in the direction of arrow VI in FIG. 7, with the plate and blower installed;

FIG. 7 shows a cross section through the object of FIG. 6 along line VII—VII;

FIG. 8 shows a straight-on view of the plate with plug strip in the direction of arrow VIII of FIG. 9; and FIG. 9 shows a cross section through the object of FIG. 9 along line IX—IX.

DETAILED DESCRIPTION OF THE PREFERRED EMBODIMENT

Figure 1:
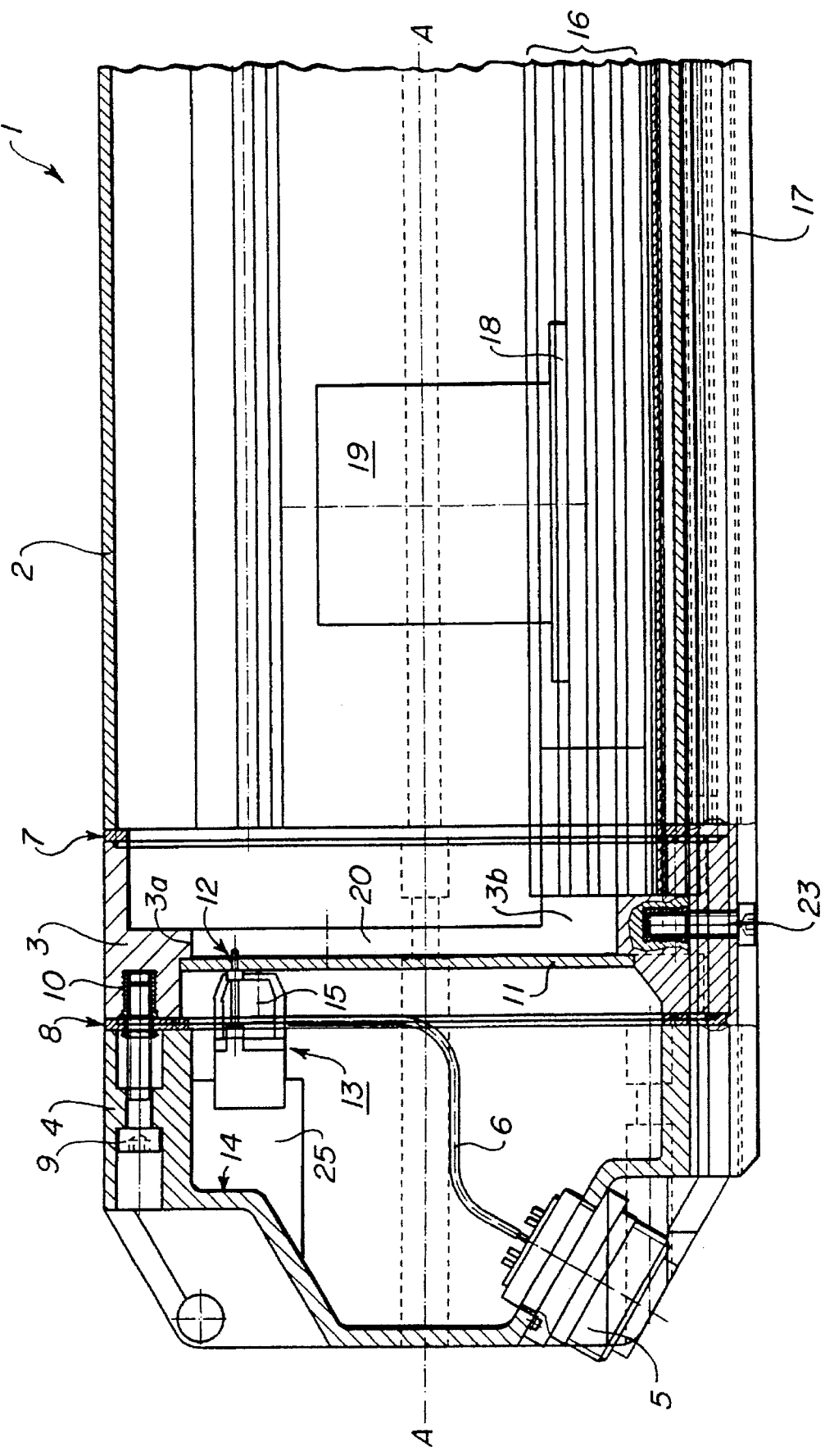
FIG. 1 shows an axial cross section through the middle and rear parts of the protective housing.

FIG. 1 shows the middle and rear parts of a protective housing 1 for a video surveillance camera, although the camera itself is not shown. This protective housing comprises a tubular housing shell 2, made from a piece of extruded section of light metal; a frame part 3 according to the invention; and a rear wall 4 with means 5 for introducing electrical lines 6, only one of which is shown. Parts 2, 3, 4 are screwed together in a water-tight manner with seals 7, 8 between them. Although frame part 3 is screwed axially to rear wall 4, only one of screws 9 and one threaded bush 10, which is embedded in frame part 3, made of injection-molded plastic, are shown.

A plate 11, which is perpendicular to housing axis A—A and carries in its upper area a first part 12 of a multiconductor plug device 13, is inserted in frame part 3. A second part 15 of multiconductor plug device 13, which can mate with first part 12, is mounted on the inside surface 14 of rear wall 4. It can be seen that parts 12 and 15 can be plugged together merely by setting rear wall 4 onto frame part 3 and by securing the attachment by tightening screws 9.

On frame part 3, an equipment carrier 16 and a housing carrier 17 are attached a certain distance apart in such a way that they are parallel to each other. Details of the equipment carrier are described in U.S. Pat. No. 5,115,263. It has several insertion levels, and into one of these a support plate 18 with an electrical component 19 is pushed. The video camera mounted on it is not shown.

Figure 2:
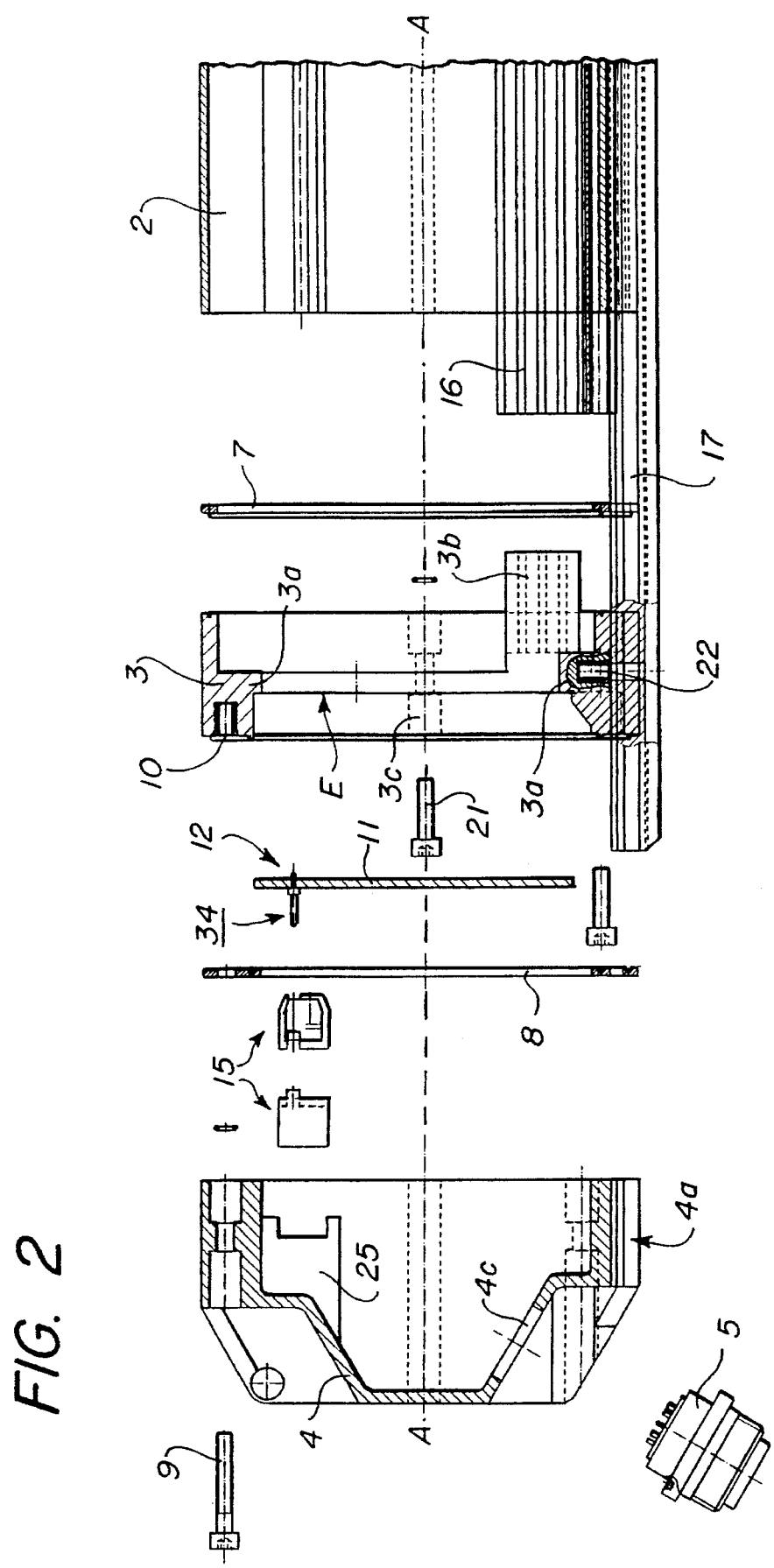
FIG. 2 shows an exploded diagram of the object according to FIG. 1.

As can be seen more clearly in FIG. 2, frame part 3 has a T-shaped cross section, the crossbar 3a of which points inward and thus forms the boundary of an opening 20, which in the present case, however, is covered by a closed plate 11, which is screwed to an attachment plane E, defined by cross bar 3a. Lines (not shown) lead from part 12 of multiconductor plug device 13 into the interior of housing shell 2.

As can be seen from FIGS. 1 and 2, frame part 3 has an extension 3b, parallel to housing axis A—A, to which equipment carrier 16 installed inside the housing is rigidly connected. Frame part 3 is screwed by means of a number of screws 21, only one of which is shown in FIG. 2, by way of bores 3c in frame part 3, to housing shell 2.

Two additional threaded bushes 22 are provided in the bottom surface of frame part 3, by means of which housing carrier 17 is held in position by screws 23, only one of which is shown in FIG. 1.

As can be seen supplementally from FIG. 6, frame part 3 has, on its bottom surface, a dovetail guide 3d, which guides frame part 3 as it is pushed onto housing carrier 17. For this purpose, housing carrier 17 has a dovetail cross section which is complementary to dovetail guide 3d. The two threaded bushes 22 of frame part 3 are located in a such way with respect to dovetail guide 3d that housing carrier 17 is screwed to frame part 3 inside the dovetail guide.

As is especially clear from FIGS. 2, 3, and 4, rear wall 4 also has on its bottom surface a dovetail guide 4a, which guides rear wall 4 as it is pushed onto housing carrier 17. Likewise, the floor of the tubular housing shell 2 is provided with a dovetail guide for guiding it onto the housing carrier 17.

FIGS. 3 and 4 show three stepped bores 24 for the passage of three screws 9, by means of which rear wall 4 is screwed to frame part 3. Rear wall 4 also has two projections 25, to which part 15 of multiconductor plug device 13 is screwed. Part 15 of the multiconductor plug device consists of three sections 15a, 15b, 15c, which form together a receptacle strip, the electrical contacts 26 of which are on the same side as the receptacle strip but below it. Rear wall 4 also has in its lower area a slanted wall section 4b, in the center of which an opening 4c for the insertion of means 5 for leading through the cable is provided. It is also possible to provide additional openings 4d on either side of opening 4c, as indicated in FIG. 3 only in dotted line.

FIG. 5 shows how rear wall 4 according to FIG. 4 is connected to the frame part 3, which in this case has a specially designed plate 11a, onto which a blower 27 is screwed. Further details of this arrangement can be derived from FIGS. 6–9.

FIGS. 8 and 9 show plate 11a, which has a circular opening 28, onto which blower 27 is screwed, the screws being inserted in bores 28a. FIG. 8 shows a special form of an outline 29, which was selected specifically so that plate 11a, and by analogy also plate 11, can be inserted into frame part 3 and screwed down tightly to attachment plane E of crossbar 3a, namely, by means of bores 28b (FIG. 8) and screws 30 (FIG. 6). FIGS. 6 and 8 also show, in dotted line, the surrounding inside edge 31 of crossbar 3a. The cross section of opening 20 is defined by this inside edge 31. To connect frame part 3 to housing shell 2, stepped bores 32 are used, through which two of screws 21 pass. So that rear wall 4 can be attached by means of three screws 9 to frame part 3, the frame part 3 has three threaded bores 33, which are formed by threaded bushes 10 previously described.

Plate 11a shown in FIGS. 7–9, like plate 11 shown in FIGS. 1 and 2, carries a first part 12 of a multiconductor plug device 13; this part is formed by a plug strip 34, which, like the receptacle strip of part 15, consists of three parts 34a, 34b, 34c. The individual plugs of this plug strip 34 have electrical contacts 12a, which are designed as soldering contacts; they are provided on the side of plate 11a facing away from rear wall 4. Similar relationships also apply to plate 11. The lines leading from these electrical contacts 12a to the electrical components of the overall system are omitted from the drawing for the sake of clarity. But it is also possible to use strip conductors with matching plugs when plate 11, 11a is designed as a circuit board.

As a result of the attachment of blower 27 to plate 11a, this plate acquires the function of a bulkhead, so that a guided flow of air is created inside the protective housing, provided that the protective housing has been equipped with the inlets and outlets described above. As a result, the cooling can be significantly improved; cooling can be necessary, for example, when the electrical components involved are subjected to high loads and/or the protective housing is exposed to sunlight. Blower 27 is an axial blower of a design known in itself.

What is claimed is:

1. Protective housing for optical equipment, comprising
   a frame part,
   an equipment carrier fixed to said frame part,
   an external housing carrier fixed to said frame part parallel to said equipment carrier,
   a tubular housing shell fixed to said frame part over said equipment carrier, and
   a rear wall fixed to said frame part opposite from said housing shell.

2. Protective housing as in claim 1 wherein said tubular housing shell, said frame part, and said rear wall each have a top and sides forming a profile, the profiles of the housing shell, frame part, and rear wall being the same.

3. Protective housing as in claim 1 wherein said frame part is made of injection molded plastic having therein threaded metal bushes for fixing said rear wall and said housing carrier thereto.

4. Protective housing as in claim 1 wherein said frame part comprises a dovetail guide which receives said housing carrier.

5. Protective housing as in claim 4 wherein said frame part is made of injection molded plastic having a threaded metal bush for fixing said housing carrier thereto, said threaded metal bush being located in said dovetail guide.

6. Protective housing as in claim 4 wherein said rear wall has a dovetail guide which receives said housing carrier.

7. Protective housing as in claim 1 wherein said frame part has an extension to which the equipment carrier is fixed.

8. Protective housing as in claim 1 wherein said frame part has an opening having an area which is at least 40% of the cross-sectional area of the frame part.

9. Protective housing as in claim 8 further comprising a removable plate fitted over said opening.

10. Protective housing as in claim 9 wherein said plate has at least one opening therethrough for passage of electrical lines.

11. Protective housing as in claim 8 further comprising a first part of a multiconductor plug device fitted to said plate and a second part of a multiconductor plug device fitted to said rear wall, said first part being matable with said second part.

12. Protective housing is in claim 11 wherein said first part comprises electrical contacts extending through said plate.

13. Protective housing as in claim 11 wherein said second part comprises contacts having first portions matable with said contacts in said first part and second portions facing said plate adjacent to said first portions.

14. Protective housing as in claim 9 wherein said plate comprises an opening in which a blower is mounted.

15. Protective housing for optical equipment, comprising
    a frame part,
    an internal equipment carrier fixed to said frame part,
    an external housing carrier fixed to said frame part parallel to said equipment carrier and separated from said equipment carrier by a gap,
    a one piece tubular housing shell comprising two at least essentially parallel sidewalls connected to each other by a roof and a floor, said floor being received in said gap, said housing shell being received telescopically over said equipment carrier, and
    a rear wall fixed to said frame part opposite from said housing shell, said rear wall having means for receiving electrical lines therethrough.

16. Protective housing as in claim 15 wherein said floor of said tubular housing shell is provided with a dovetail guide, said external housing carrier having a dovetail cross section which is complementary to the dovetail guide on said floor, whereby said tubular housing shell is received on said housing carrier in a sliding fit.

17. Protective housing as in claim 16 wherein said frame part is provided with a dovetail guide which is received on said dovetail cross section of said housing carrier.

18. Protective housing as in claim 16 wherein said rear wall is provided with a dovetail guide which is received on said dovetail cross section of said housing carrier.

19. Protective housing as in claim 15 further comprising
    a first part of a multiconductor plug device fixed with respect to said frame part, and
    a second part of a multiconductor plug device fixed with respect to said rear wall, said second part being matable to said first part.

* * * * *